US008706397B2

(12) United States Patent
Adler (10) Patent No.: US 8,706,397 B2
(45) Date of Patent: Apr. 22, 2014

(54) SYSTEM AND METHOD FOR DETERMINING AN OPTIMAL ROUTE USING AGGREGATED ROUTE INFORMATION (75) Inventor: Andrew Adler, Canoga Park, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 197 days.

(21) Appl. No.: 13/179,805

(22) Filed: Jul. 11, 2011

(65) Prior Publication Data
US 2013/0018574 A1 Jan. 17, 2013

(51) Int. Cl.
G01C 21/34 (2006.01)

(52) U.S. Cl.
USPC .............................. 701/408; 701/416; 701/423

(58) Field of Classification Search
USPC ......... 701/410, 212, 207, 211, 117, 209, 200, 701/408, 412, 400, 202, 206, 424, 210, 423, 701/416; 340/995.12; 370/328; 455/456.5, 455/456.6
See application file for complete search history.

(56) References Cited

U.S. PATENT DOCUMENTS

| 7,343,242 | B2 * | 3/2008 | Breitenberger et al. ...... 701/117 |
| 7,430,218 | B2 * | 9/2008 | Lee et al. ...................... 370/464 |
| 7,512,487 | B1 * | 3/2009 | Golding et al. ............... 701/424 |
| 7,844,482 | B1 * | 11/2010 | Larson .......................... 705/7.31 |
| 7,979,300 | B2 * | 7/2011 | Chandra ....................... 705/7.29 |
| 8,160,812 | B1 * | 4/2012 | Ng et al. ........................ 701/408 |
| 8,200,426 | B2 * | 6/2012 | Pu et al. ......................... 701/412 |
| 8,208,382 | B2 * | 6/2012 | Jerbi et al. .................... 370/241 |
| 8,214,141 | B2 * | 7/2012 | Froeberg ........................ 701/400 |
| 8,254,301 | B2 | 8/2012 | Chen et al. |
| 8,369,263 | B2 * | 2/2013 | Dowling et al. .............. 370/328 |
| 8,385,946 | B2 * | 2/2013 | Forstall et al. ............. 455/456.6 |
| 8,392,111 | B2 * | 3/2013 | Ryu et al. ...................... 701/410 |
| 2002/0150050 | A1 * | 10/2002 | Nathanson .................... 370/241 |
| 2003/0187570 | A1 * | 10/2003 | Impson et al. ................ 701/117 |
| 2003/0201912 | A1 * | 10/2003 | Hashida et al. .......... 340/995.12 |
| 2004/0024522 | A1 * | 2/2004 | Walker et al. ................. 701/210 |
| 2005/0134440 | A1 * | 6/2005 | Breed ............................ 340/435 |
| 2006/0089792 | A1 * | 4/2006 | Manber et al. ................ 701/207 |
| 2006/0161315 | A1 | 7/2006 | Lewis et al. |
| 2006/0161343 | A1 * | 7/2006 | Agnew et al. ................. 701/211 |
| 2006/0178819 | A1 * | 8/2006 | Couckuyt et al. ............ 701/209 |
| 2006/0184314 | A1 * | 8/2006 | Couckuyt et al. ............ 701/202 |
| 2007/0002866 | A1 * | 1/2007 | Belstner et al. ............ 370/395.4 |
| 2007/0027614 | A1 | 2/2007 | Reeser et al. |
| 2007/0179701 | A1 * | 8/2007 | Hamilton et al. ............. 701/200 |
| 2008/0109154 | A1 * | 5/2008 | Auxer et al. .................. 701/117 |
| 2008/0294337 | A1 * | 11/2008 | Dawson et al. ............... 701/209 |
| 2009/0005082 | A1 * | 1/2009 | Forstall et al. ............. 455/456.5 |
| 2009/0319172 | A1 | 12/2009 | Almeida et al. |
| 2010/0004858 | A1 * | 1/2010 | Risov et al. .................... 701/209 |
| 2010/0010732 | A1 * | 1/2010 | Hartman ....................... 701/200 |

(Continued)

Primary Examiner — Calvin Cheung
(74) Attorney, Agent, or Firm — Alleman Hall McCoy Russell & Tuttle LLP (57) ABSTRACT A system for providing navigation information is provided. A navigation server receives route information from multiple mobile devices. A storage module stores the route information received from the mobile devices as aggregated route information. In response to receipt of a request for direction information from a starting location to a destination location, a route calculation module calculates one or more potential routes from the starting location to the destination location. An optimal route determination module determines which route of the one or more potential routes is an optimal route. The optimal route is determined based on the aggregated route information and a preselected criterion.

14 Claims, 4 Drawing Sheets (56) References Cited

U.S. PATENT DOCUMENTS

| | | |
|---|---|---|
| 2010/0039314 A1 | 2/2010 | Gupta |
| 2010/0088023 A1* | 4/2010 | Werner .......................... 701/206 |
| 2010/0188265 A1 | 7/2010 | Hill et al. |
| 2010/0211304 A1* | 8/2010 | Hwang et al. ................. 701/200 |
| 2010/0246470 A1* | 9/2010 | Jerbi et al. .................... 370/312 |
| 2010/0274475 A1* | 10/2010 | Antonenco et al. ........... 701/201 |
| 2010/0324817 A1* | 12/2010 | Hansen et al. ................. 701/210 |
| 2011/0006913 A1* | 1/2011 | Chen et al. .................... 340/902 |
| 2011/0128902 A1* | 6/2011 | Guo .............................. 370/312 |
| 2011/0246068 A1 | 10/2011 | Luo et al. |
| 2012/0038489 A1* | 2/2012 | Goldshmidt .................. 340/903 |
| 2012/0120883 A1 | 5/2012 | Chen et al. |
| 2012/0253661 A1* | 10/2012 | Tuukkanen ................... 701/423 |
| 2013/0060469 A1* | 3/2013 | Chen et al. .................... 701/527 |

* cited by examiner

SYSTEM AND METHOD FOR DETERMINING AN OPTIMAL ROUTE USING AGGREGATED ROUTE INFORMATION

FIELD OF THE INVENTION

This invention relates to navigation systems and more particularly to navigation systems that provide directions along a route from a present location to a destination.

BACKGROUND

Drivers increasingly use in-vehicle navigation systems to obtain driving directions when traveling to a destination. In-vehicle navigation systems may be adapted to calculate a route from a starting point to a destination and provide directions to a driver as the driver travels along the route. There may be many potential routes to a destination. Conventional navigation systems, therefore, may be adapted to determine an optimal route based on heuristics that estimate, for example, the distance to the destination or the time to reach the destination.

In some circumstances, however, conventional navigation systems may select a route that is less than optimal because they may not be adapted to analyze actual historical travel times along a route. As a result, some conventional navigation systems may select a route having a longer travel time compared to other potential routes.

Therefore, a need exists for a navigation system and method that analyzes actual historical data and other route information when determining an optimal route to a destination.

SUMMARY

A system for providing navigation information is provided. A navigation server receives route information from multiple mobile devices. A storage module stores the route information received from the mobile devices as aggregated route information. In response to receipt of a request for direction information from a starting location to a destination location, a route calculation module calculates one or more potential routes from the starting location to the destination location. An optimal route determination module determines which route of the one or more potential routes is an optimal route. The optimal route is determined based on the aggregated route information and a preselected criterion.

A method of providing navigation information is also provided. Route information is received from multiple mobile client devices, and the route information received from the mobile devices is stored as aggregated route information. In response to receipt of a request for direction information from a starting location to a destination location, one or more potential routes from the starting location to the destination location are calculated. An optimal route in the one or more potential routes is determined based on the aggregated route information and a preselected criterion.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

A system that determines an optimal route to a destination using aggregated route information is provided. An optimal route may be described as the route that requires the least amount of time to reach the destination. It will be understood, however, that additional or alternative metrics may be used to determine which routes are optimal routes.

As seen, the system analyzes route information to determine which route to a destination is the optimal route to the destination. Route information may include: route progression information aggregated from multiple users; user ratings of routes traveled aggregated from multiple users; traffic conditions (e.g., congestion); road conditions (e.g., closures and constructions); road incidents (e.g., accidents); time-of-day (e.g., rush hour or midday); estimated time-to-destination information; estimated distance-to-destination information; the particular preferences of a user; and other information relating to one or more routes to the destination. Route progression information refers to the amount of time it takes a user to travel along a particular segment of a route. User ratings relate to users' subjective like or dislike of routes traveled. Aggregated route information refers to information relating to the route that the system collects from multiple users.

The system receives a request from a user requesting direction information to a destination. In response to receipt of the request, the system calculates potential routes to the destination and then determines which potential route is the optimal route. In order to determine which route is the optimal route, the system analyzes the aggregated route information for the potential routes. Based on, for example, the historical travel times along the potential route or user ratings of the route, the system determines which route is the optimal route. An optimal route may be, for example, the route having the lowest historical travel time, the highest user rating, or a combination of these metrics. The system may then transmit direction information for the optimal route to the user in order to guide the user to the destination.

When analyzing route information to determine which potential route is the optimal route, it is advantageous to have a large data set to analyze. Analyzing route information from a single user may not provide a data set large enough to confidently identify which potential route is the optimal route. Accordingly, the described system advantageously aggregates route information from multiple users to build a data set large enough to identify the optimal route with sufficient confidence. Moreover, as the system continues to aggregate route information from multiple users, confidence that a potential route is the optimal route may increase.

The system may aggregate route information from multiple users while traveling to and after arriving at the destination. While traveling, users may continually transmit route progression information to the system for storage. After arriving at a destination, users may transmit a user rating to the system that relates to the users' like or dislike of the traveled route. The system stores this aggregated route information for subsequent analyses of which potential routes are optimal routes. As a result, the system learns which routes to a destination are the optimal routes to the destination based on, for example, how long it takes most users to reach that destination or users' opinions of the routes to the destination.

Figure 1:
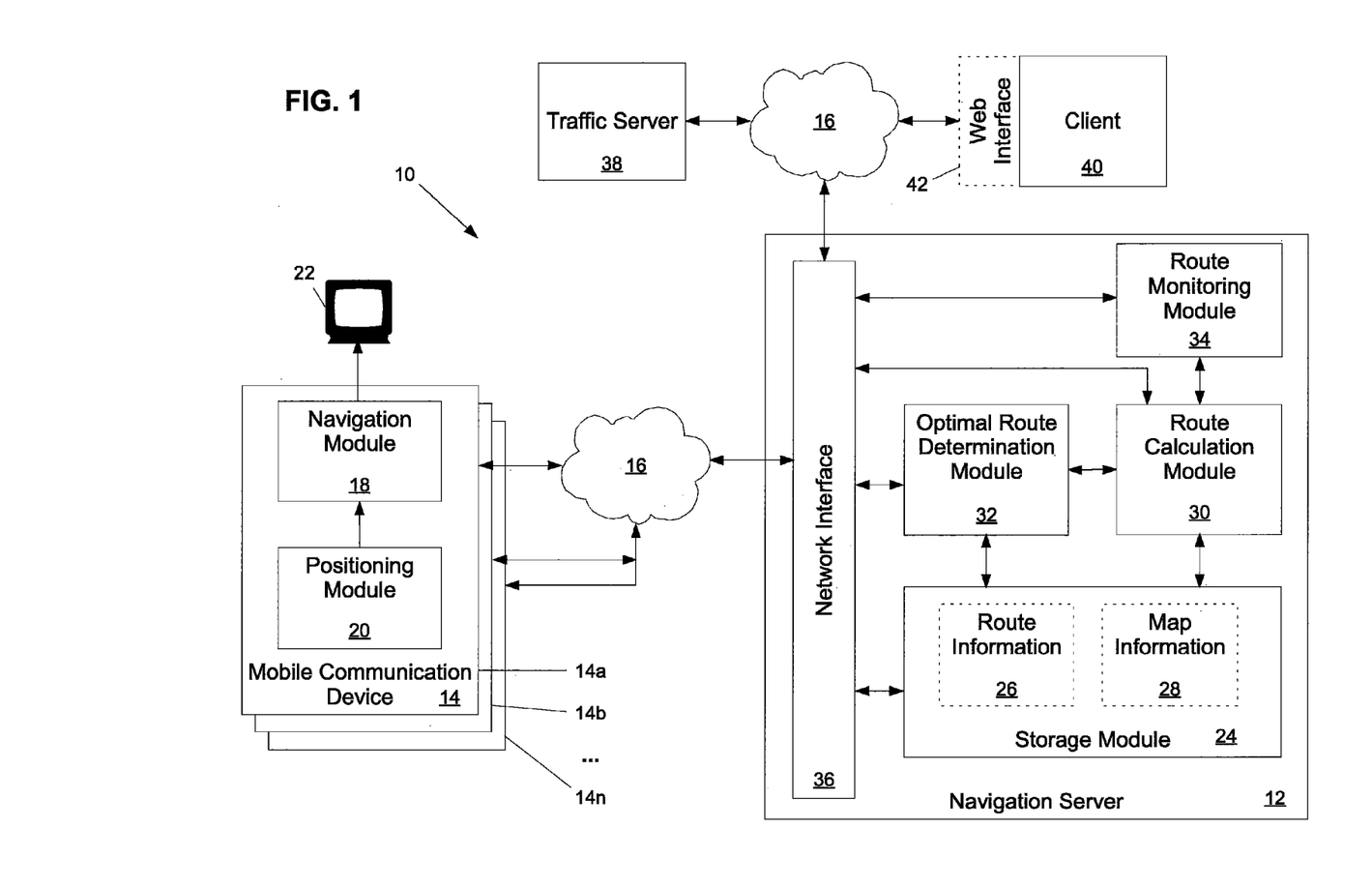
FIG. 1 is a block diagram of an example of an implementation of a system for determining an optimal route to a destination using aggregated route information.

Referring to FIG. 1, an example of an implementation of a system 10 for determining an optimal route using aggregated route information is shown. A navigation server 12 is in signal communication with multiple mobile communication devices 14a-n via a network. A mobile communication device 14 may request and receive direction information from the navigation server 12. The mobile communication device 14 in FIG. 1 transmits its present location and a desired destination to the navigation server 12. In response, the navigation server 12, in this example, calculates one or more potential routes to the destination, determines which potential route is the optimal route to the destination, and transmits to the mobile communication device 14 direction information to the destination via the optimal route.

The mobile communication devices 14a-n may be, for example, telematics devices (e.g., vehicle navigation devices) that request direction information from the navigation server and display the direction information to a user (e.g., a driver of a vehicle). The telematics devices may be configured for modes of transportation other than vehicle transportation. For example, the navigation devices may be configured for use by a pedestrian or for use with bicycle travel.

The mobile communication device 14 in FIG. 1 includes a navigation module 18 in signal communication with a position determination module 20. The position determination module 20 determines the present location of the mobile communication device 14 and may be, for example, a Global Positioning System (GPS) unit. The navigation module 18, in this example, transmits requests for direction information to the navigation server 12 and receives the requested direction information in response. The navigation module 18 may also be in signal communication with a display device 22 that displays the received direction information as a user proceeds along the route to the destination.

The request for direction information may include the present location of the mobile communication device 14 (e.g., the present location of a vehicle) and a destination. In response to receipt of the request, the navigation server 12 may determine one or more potential routes from the present location to the destination. The navigation server 12 may analyze aggregated route information to determine which potential route is the optimal route. Then the navigation server 12 may then transmit direction information relating to the optimal route to the mobile communication device 14. The direction information relating to the optimal route may include, for example, driving directions to the destination via the optimal route.

The direction information received at the mobile communication device 14 may be displayed to a user at the display device 22. The display device 22 may be any device capable of converting electrical signals into a visually perceivable form. For example, the display device may be, but not limited to, a liquid crystal display (LCD), a cathode-ray tube (CRT) display, an electroluminescent display (ELD), a heads-up display (HUD), a plasma display panel (PDP), an organic light emitting diode (OLED) display, a vacuum fluorescent display (VFD), and the like.

As a user travels along a route to a destination the mobile communication device 14 may transmit route progression information to the navigation server 12 for storage as aggregated route information. As the user progresses along the route, the position determination module 20 may continually determine the current position of the user and the mobile communication device 14. The mobile communication device 14 may continually transmit to the navigation server 12 the current position as well as a timestamp for that position. The navigation server 12 may store the current position and timestamp as route progression information. In this way, the navigation server 12 may keep track of how long it takes a user to progress along the route to the destination. Once the user reaches the destination, the navigation server 12, in this example, has a history of how long it took the user to reach the destination as well as how long it took to travel each segment of the route.

The mobile communication device 14 may also allow a user to input a user rating relating to the user's preference for the route (i.e., the user's like or dislike of the route). The mobile communication device 14 may display a user input display (not shown) at the display device 22. The user input display may include user input elements for receiving user ratings from the user. User ratings may be numerical ratings in which a user rates the route on a numerical scale or, alternatively, graphical ratings in which a user rates the route by selecting a desired number of graphical icons. Additional or alternative approaches for rating the route may be selectively employed. A user may input a user rating for the route, for example, while in transit to the destination or after reaching the destination. As discussed further below, users may also input user ratings for routes to destinations via a web interface at a web browser-enabled client at any time.

The processes discussed above may be performed for all mobile client devices 14a-n in signal communication with the navigation server 12 that travel along the route. The processes may also be repeated during subsequent trips along the route. As more users travel along the route and transmit route progression data and user ratings to the navigation server 12, the amount of historical data the navigation server 12 has to determine which route is an optimal route increases. Thus, instead of relying on historical data and ratings from a single user, the navigation server 12 may analyze historical data obtained and aggregated from multiple users. This approach advantageously increases the confidence that a potential route to a destination is the optimal route to the destination.

The navigation server 12 of FIG. 1 may be, for example, a cluster of one or more interconnected servers configured for receiving and aggregating route information, determining optimal routes to destinations using the route information, and transmitting direction information to mobile communication devices 14a-n. Accordingly, the navigation server 12 may include: a storage module 24 for storing route information 26 and map information 28; a route calculation module 30 for calculating potential routes to a destination; an optimal route determination module 32 for determining the optimal route to the destination; a route monitoring module 34 for monitoring progression along a route; and a network interface 36 to manage network communications.

The network interface 36 of the navigation server 12 manages the communications between the navigation server 12 across one or more networks 16. The networks may include, for example, a cellular network and a packet-switched network (e.g., the Internet). Accordingly, the navigation server 12 communicates over the networks using one or a combination of wired or wireless technologies as well as one or a combination of networking protocols. Packet-switched communications may be transmitted using one or more internet protocols, e.g., TCP/IP and HTTP. Cellular communications may be transmitted using a mobile telecommunication standard, e.g., Global System for Mobile Communications (GSM) and the like.

In addition to the mobile communication devices 14*a-n*, the navigation server 12 may be in signal communication with other remote clients. The remote clients may be, for example, a traffic server 38 and a web browser-enabled client 40. The traffic server 38 may provide traffic information in response to receipt of requests for traffic information. The navigation server 12 may request traffic information from the traffic server 38 and receive the requested traffic information from the traffic server 38 in response. The route calculation module 30 and optimal route determination module 32 may then use the traffic information when calculating potential routes to a destination and determining which route is the optimal route.

The web browser-enabled client 40 may display a web interface 42 to a user in a web browser at which the user may input user ratings for traveled routes. The web browser-enabled client 40 may submit a request for a web page to the navigation server 12. A web server (not shown) at the navigation server 12 may receive the request and transmit the web page to the client 40 in response. The web page may include a web interface that displays a list of routes to respective destinations. The web page may also include input controls for receiving user ratings for the displayed routes from the user. The web browser-enabled client 40 may then transmit the user ratings to the navigation server 12 for storage as aggregated route information 26. The web browser-enabled client 40 may be, for example, a desktop computer, a laptop computer, a tablet computer, a personal digital assistant (PDA), a cellular telephone, a television, a television set-top box, a video game console, and other devices capable of displaying a list of routes and receiving user ratings for the displayed routes.

The storage module 24 may store map information 28 and aggregated route information 26. The map information 28 may include a digital map of a road network and other types of information relating to the road network and a corresponding geographic area. The route information 26 may include: a listing of one or more routes from a location to a destination; aggregated route progression information; and aggregated user ratings of routes traveled. The route calculation module 30 and the optimal route determination module 32 in FIG. 1 are in signal communication with the storage module 24 and utilize the aggregated route information 26 and map information 28 stored in the storage module 24 to calculate potential routes and determine an optimal route to a destination.

The storage module 24 may be, for example, a database system that includes one or more databases. The aggregated route information 26 and the map information 28 may be stored, for example, in one or more tables of the databases. The databases may be implemented according to, e.g., the relational database model. Additional or alternative database models may be selectively employed such as, for example, the flat-file model and the object-oriented model. Additionally, the databases may be implemented as a MySQL database management system or an SAS database management system. Additional or alternative database management systems may also be selectively employed. It will be understood that the storage module 24 may be an internal component of the navigation server or, additionally or alternatively, an external component in signal communication with the navigation server 12. It will also be understood that the aggregated route information may be stored at the storage module 24 permanently for persistent storage or, additionally or alternatively, temporarily for processing. It will further be understood that the navigation server 12 may receive the aggregated route information from a mobile client device 14 along a direct or indirect path.

The route calculation module 30 of the navigation server 12 calculates potential routes to a destination. The route calculation module 30 in FIG. 1 is in signal communication with the storage module 24 and accesses the map information 28 and route information 26 stored at the storage module 24. Using the map information 28, the route calculation module 30 calculates one or more potential routes to the destination. The optimal route determination module 32 then determines which potential route to the destination is the optimal route to the destination.

The optimal route determination module 32 may analyze different types of route information 26 when determining which potential route to a destination is the optimal route to the destination. Types of route information 26 that the optimal route determination module 32 may consider include aggregated route progression information and aggregated user ratings. The optimal route determination module 32 may also consider the particular preferences of the user requesting the direction information, current and historical traffic conditions, road conditions, road incidents, time-of-day, time estimates, and distance estimates. Further, the optimal route determination module 32 may weight each type of route information 26 such that some types of route information are considered to be more relevant than other types.

The optimal route determination module 32 may include a machine-learning neural network that is trainable using temporal difference methods. As used in this application, temporal difference methods refer to prediction methods in which predictions (or current estimates) are made on the basis of a set of observations (or previous estimates). As more observations are compiled, predictions and subsequent estimates may become more accurate. In this example, the observations include the aggregated route information—in particular, the estimated time to a destination, historical times to the destination, user ratings for routes, etc.

The optimal route determination module 32 may create the machine-learning neural network by applying values to the aggregated route information as well as to the different types of aggregated route information. The optimal route determination module 32 may also prioritize the aggregated route information. For example, the optimal route determination module 32 may prioritize route information aggregated relatively recently over relatively older aggregated route information. As another example, the optimal route determination module 32 may prioritize aggregated route information clustered around a common value.

The machine-learning neural network employed in the optimal route determination module 32 may also be tunable to provide optimal routes based on various criteria. The optimal route determination module 32 may tune and dynamically configure the machine-learning neural network by, for example, adjusting the weighted values for the aggregated route information and types of aggregated route information. As an example, the optimal route determination module 32 may adjust the weighted values for criteria such as time to the destination, shortest route, highest rated route, least traveled route, etc., based on user preferences or changing conditions (e.g., traffic incidents). In this way, the optimal route determination module 32 may dynamically tune, configure, and prioritize the process of determining which potential route to a destination is the optimal route.

Once the optimal route determination module 32 determines which potential route is the optimal route, the navigation server 12 transmits to the mobile client device 14 direction information relating to the optimal route. The direction information may include, for example, driving directions that guide a user to the destination as the user travels along the route. As discussed above, the navigation server 12 may receive and store route progression information as the user travels along the route. While in transit or after reaching the destination, the user may transmit to the navigation server 12 a user rating of the route as discussed above. The route information 26 aggregated from the user's trip thus provides the navigation server 12 with further information that may be used when subsequently determining optimal routes to the destination.

The route monitoring module 34 is in signal communication with the route calculation module 30 and may monitor the progression of the mobile communication device 14 along the route. As mentioned above, the mobile communication device 14 may continually transmit its present location to the navigation server 12. The route monitoring module 34 may analyze the successive locations of the mobile communication device 14 to determine how fast the device is progressing along the route. If the route monitoring module 34 determines that progression along a route is too slow, the route monitoring module 34 may initiate calculation and determination of a new optimal route to the destination. If the optimal route determination module 32 determines that another route is the optimal route to the destination, the navigation server 12 may transmit to the mobile client device 14 direction information that diverts a user onto the new optimal route. In this way, the navigation server 12 may provide a user with the optimal route to a destination throughout the duration of the trip rather than just at the beginning of the trip.

Figure 2:
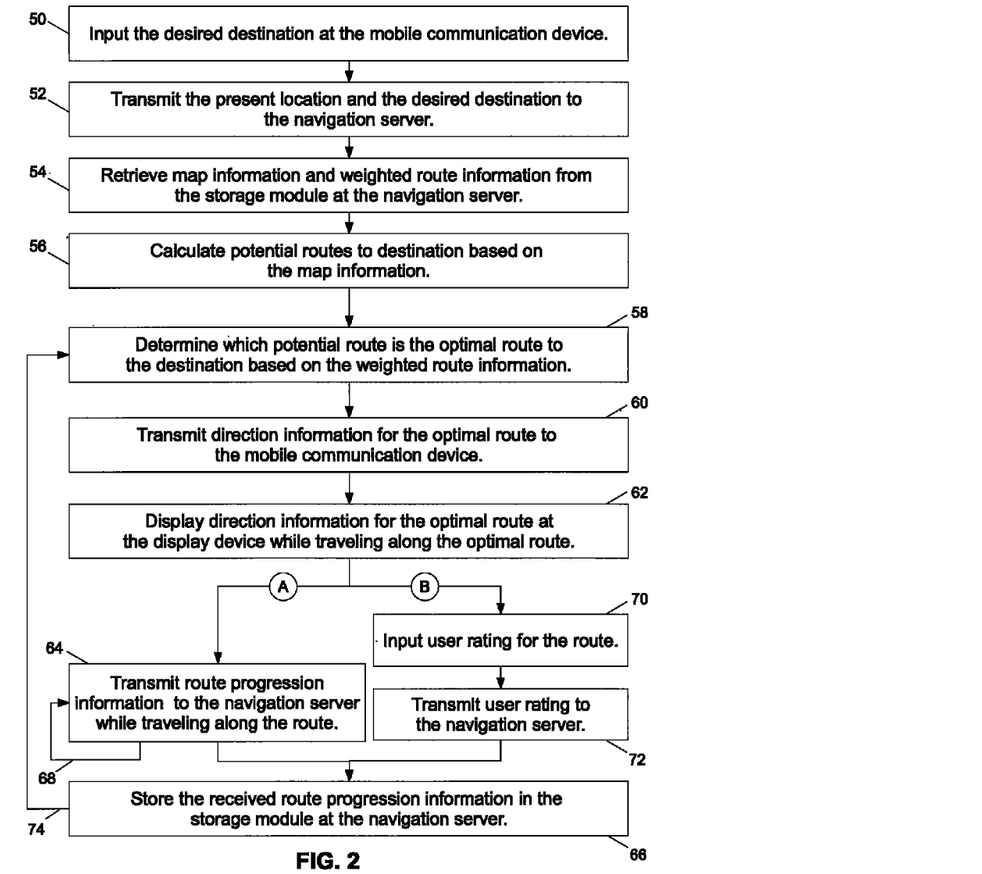
FIG. 2 is a flowchart of an example of an implementation of a method for determining an optimal route to a destination using aggregated route information.

Referring now to FIG. 2, a flowchart of an example of a method for determining an optimal route to a destination using aggregated route information is shown. At step 50, the desired destination is input at the mobile communication device 14. Then, at step 52, the mobile client device 14 transmits the desired destination to the navigation server 12 along with the present location of the mobile client device 14. A position determination module 20 at the mobile client device (e.g., a GPS unit) may determine the present location of the mobile client device 14. In response to receipt of the present location and desired destination, the navigation server 12 retrieves the map information 28 from the storage module 24 at step 54. The navigation server 12 then calculates one or more potential routes to the destination based on the map information 28 at step 56. Then, at step 58, the navigation server 12 determines which potential route to the destination is the optimal route to the destination based on the weighted route information. The navigation server 12 then transmits direction information for the optimal route to the mobile communication device 14 at step 60. The mobile communication device 14 displays, at step 62, the direction information for the optimal route while traveling along the optimal route.

In this example, the method then proceeds along two paths, path A and path B. Along path A at step 64, the mobile communication device 14 transmits route progression information (i.e., the present location and a corresponding timestamp) to the navigation server 12. The navigation server 12 stores the received route progression information in the storage module 24 at step 66. As indicated by the arrow 68 that loops back to step 64, the mobile communication device 14 may continually transmit the present location and a corresponding timestamp of the device as the user travels along the route. In this way, a user's progress along segments of the route may be tracked.

Along path B at step 70, a user inputs user ratings for the route. As discussed above, a user may input a user rating for the route at the mobile communication device 14 or at a separate web browser-enabled client 40. Further, the user may input the user rating while in transit to the destination, after the user reaches the destination, or at any other time. At step 72, the user rating received from the user is transmitted to the navigation server 12 and stored in the storage module 24 at step 66. As indicated by arrow 74, once the navigation server 12 has stored the aggregated route information 26 at step 66, the navigation server 12 may use the stored aggregated route information 26 when subsequently determining which route to the destination is the optimal route at step 58. By aggregating route information 26, the navigation server 12 advantageously learns which routes are optimal routes, and subsequent determinations of the optimal route are improved.

Figure 3:
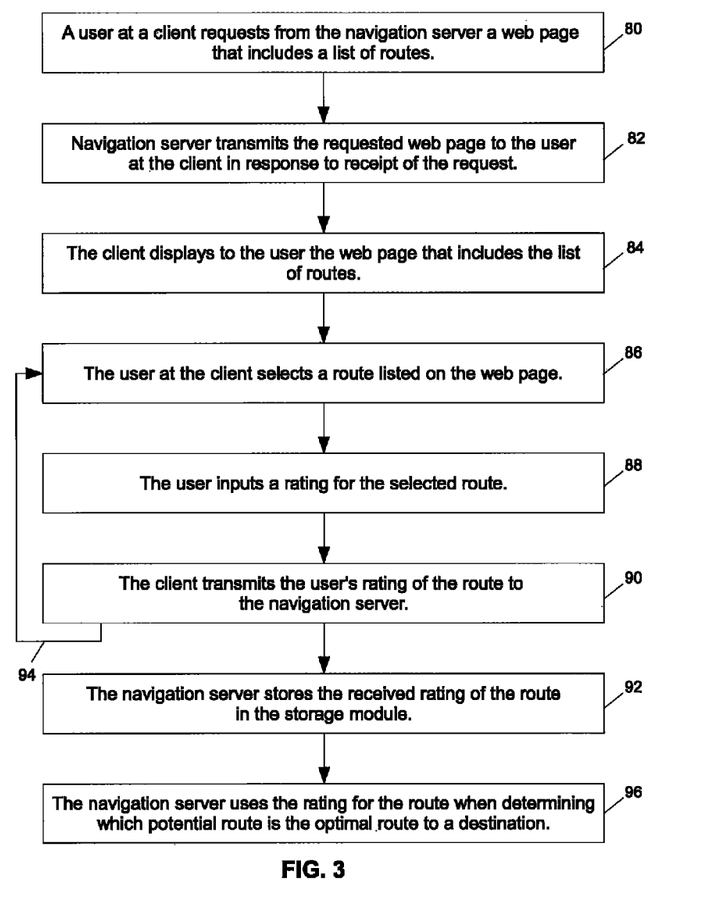
FIG. 3 is a flowchart of an example process for inputting user ratings at a web browser-enabled client.

Referring now to FIG. 3, a flowchart of an example process for inputting user ratings at a web browser-enabled client 40 is shown. At step 80, a user at a web browser-enabled client 40 requests from the navigation server 12 a web page having a web interface that includes a list of routes. The navigation server 12 responds to the request at step 82 and transmits the web page to the client. The web browser-enabled client displays the web page and the list of routes at step 84. A user at the client 40 may select a route to rate at step 86 and input a user rating for the route at step 88. The client 40 may then, at step 90, transmit the user rating for the route to the navigation server 12. The navigation server 12 may store the received user rating for the route in the storage module at step 92. As indicated by arrow 94, steps 86-90 may be repeated if the user selects another route to rate. The navigation server 12 may then use the stored ratings for the routes when determining, at step 96, which potential route to a destination is the optimal route. By aggregating user ratings for routes, the navigation server 12 advantageously learns which routes users like and dislike and subsequent determinations of the optimal route are improved.

Figure 4:
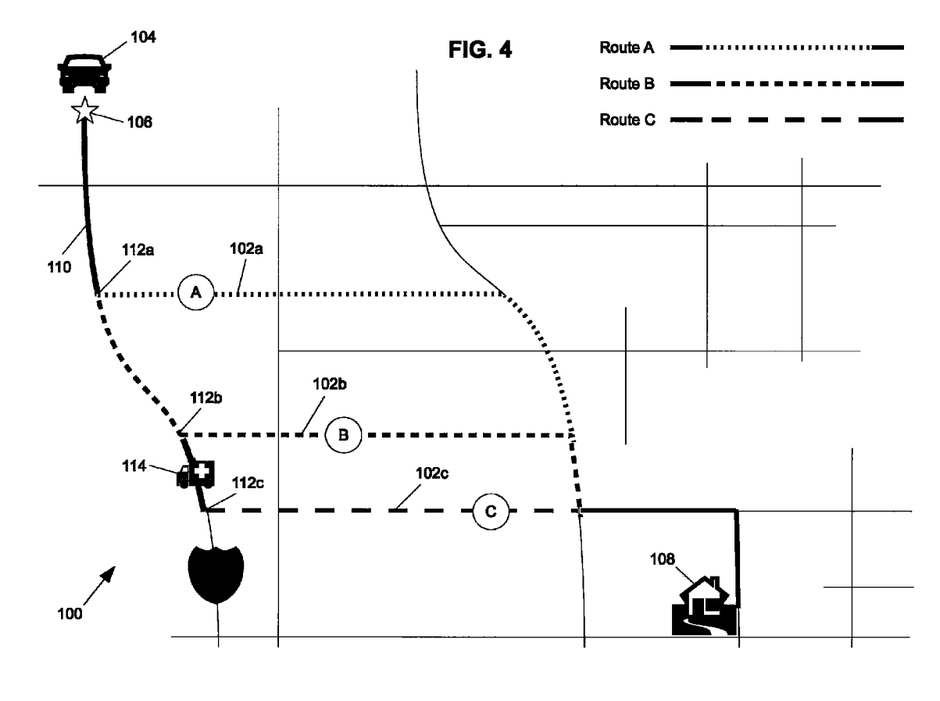
FIG. 4 is a diagram of three potential routes from a starting point to a destination.

FIG. 4 is a diagram 100 of three potential routes 102*a-c* for a vehicle 104 from a starting point 106 to a destination 108. As seen in FIG. 4, the potential routes include route A 102*a* as depicted by the small-dashed line, route B 102*b* as depicted by the medium-dashed line, and route C 102*c* as depicted by the large-dashed line. As seen, the vehicle 104 in FIG. 4 begins all three routes on the interstate 110. However, the vehicle in FIG. 4 may exit the interstate at various points 112*a-c* and continue to the destination 108 along various surface streets. Route A 102*a* in FIG. 4 includes the most amount of travel along surface streets and the least amount of travel along the interstate 110. Route C 102*c* in FIG. 4 includes the most amount of travel along the interstate 110 and the least amount of travel along the surface streets. Route B 102*b* in FIG. 4 includes an amount of interstate and surface street travel somewhere between route A and route C.

Travel times to the destination 108 may vary and depend on, for example, time-of-day, traffic conditions, etc. As a first example, users may expect that route C 102*c* is the fastest route to the destination 108 since most of the traveling is done on the interstate 110. However, this may not be true during heavy traffic. During rush hour, for example, the interstate 110 may be heavily trafficked and travel along surface streets may be preferable. The navigation server 12 (FIG. 1) may store aggregated route information 26 that shows route progression along the interstate 110 during rush hour is relatively slow. The navigation server 12 may analyze the stored aggregated route information 26 to thus determine that route A 102*a* would be faster than route C 102*c* and that route A is therefore the optimal route to the destination 108.

As a second example, route B 102*b* may include more lanes and fewer traffic lights than route A 102*a*. As a result, users may rate route B 102*b* as the better route to the destination 108 (i.e., input a higher rating for route B than route A). The navigation server 12 may store these ratings as aggregated route information 26. When assessing whether route A 102*a* or route B 102*b* is the optimal route to the destination 108 based on user ratings, the navigation server 12 may analyze the ratings to determine that route B is the better and thus optimal route to the destination.

The navigation server 12 may utilize other types of route information in conjunction with the aggregated route information when determining which route is the optimal route to the destination. Further, the navigation server 12 may monitor the progression of the user along the route and recalculate which route is the optimal route to the destination. If the navigation server 12 determines that another route is the optimal route to the destination, the navigation server may transmit direction information to the mobile communication device 14 that directs the user onto the new optimal route as discussed above.

As a third example, the navigation server 12 may determine that route C 102*c*, which is mostly along the interstate 110, is the optimal route to the destination 108. As the user travels along route C 102*c*, the mobile communication device 14 may continually transmit the present location allowing the navigation server 12 to monitor progress along the route. A traffic incident 114 such as, for example, an accident may result in heavy traffic along route C 102*c*. The navigation server 12 may recognize that progress along the route has slowed. Additionally, the navigation server 12 may receive updated traffic information from a traffic server 38 that informs the navigation server of the traffic incident 114. In response, the navigation server 12 may recalculate which route to the destination 108 is the optimal route. In this example, the navigation server 12 may determine that a detour along route B 102*b* is the optimal route based on the current progression along route C 102*c* and the existence of a traffic incident 114 along route C. In response to this determination, the navigation server 12 may transmit updated direction information to the mobile communication device 14 that directs a user to divert from route C 102*c* onto route B 102*b* and continue to the destination 108.

It will be understood that the aggregated route information used to determine which route is the optimal route is context-sensitive. If the criteria for determining the optimal route is time-to-destination, for example, then the optimal route determination module 32 may use the aggregated historical travel times to the destination. In another context, the optimal route determination module 32 may use the aggregated user ratings to determine the optimal route when the criterion is the route having the highest rating. In still another context, the criterion may be the favorite route of the driver in which case, the optimal route determination module 32 may use the ratings input by the driver himself to determine the optimal route. The optimal route determination module 32 may also use any combination of aggregated route information to determine the optimal route as discussed above.

It will be understood and appreciated that one or more of the processes, sub-process, and process steps described in connection with FIGS. 1-3 may be performed by hardware, software, or a combination of hardware and software on one or more electronic or digitally-controlled devices. The software may reside in a software memory (not shown) in a suitable electronic processing component or system such as, for example, one or more of the functional systems, devices, components, modules, or sub-modules schematically depicted in FIG. 1. The software memory may include an ordered listing of executable instructions for implementing logical functions (that is, "logic" that may be implemented with in digital form such as digital circuitry or source code, or in analog form such as analog source such as an analog electrical, sound, or video signal). The instructions may be executed within a processing module, which includes, for example, one or more microprocessors, general purpose processors, combinations of processors, DSPs, or ASICs. Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product and selectively embodied in any non-transitory computer-readable storage medium for use by or in connection with an instruction execution system, apparatus, or device, such as a computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program can be electronically captured via, for instance, optical scanning of the paper or other medium, then compiled, interpreted, or otherwise processed in a suitable manner if necessary, and then stored in a computer memory or machine memory.

It will also be understood that the term "in signal communication" as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electro-chemical, optical, wired, or wireless connections. The signal paths may also include additional systems, devices, components, modules, or sub-modules between the first and second system, device, component, module, or sub-module.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A system for providing navigation information comprising:
   a network interface module, executable by a processor of a navigation server to receive a first plurality of progression information associated with a particular route segment from a first mobile device traveling the route segment, the particular route segment defined to be only part of a route being travelled by the first mobile device;
   a memory of the navigation server configured to store the first plurality of progression information as aggregated route information associated with the particular route segment, where the aggregated route information contains a second plurality of progression information associated with the particular route segment, the second plurality of progression information received from a second mobile device traveling the particular route segment as part of a route being travelled by the second mobile device;
   a route calculation module, executable by the processor to calculate, in response to receipt of a request by a client device for direction information from a starting location to a destination location, a plurality of potential routes from the starting location to the destination location, where a potential route from among the plurality of potential routes comprises a series of route segments including the particular route segment;
   an optimal route determination module, executable by the processor to calculate a rating of the potential route based on route information associated with each route segment in the series of route segments, including the aggregated route information of the particular route segment, and a preselected criterion;
   the optimal route determination module further configured to determine an optimal route from the plurality of potential routes based on the rating of each of the plurality of potential routes; and
   the network interface module further configured to transmit the optimal route to the client device.

2. The system of claim 1 where the aggregated route information associated with the particular route segment includes a plurality of user ratings of the route segment.

3. The system of claim 2 where the user ratings are received at the network interface module of the navigation server from the first mobile device or from a web browser of a web browser-enabled device.

4. The system of claim 1 where:
   a progression information of the first plurality of progression information includes a present location of the first mobile device along the particular route segment and a corresponding timestamp information; and
   a route monitoring module of the navigation server is executable by the processor, to continually receive the progression information from the first mobile device while the first mobile device is in transit along the particular route segment.

5. The system of claim 2 where the route monitoring module is further configured to:
   monitor a progression information received from the client device while the client device is in transit along the optimal route;
   determine, based on the progression information received from the client device, that the optimal route no longer satisfies the preselected criterion and in response to the determination that the optimal route no longer satisfies the preselected criterion:
   the route calculation module further executable to calculate a new plurality of potential routes from a present location of the client device to the destination location;
   the optimal route determination module further configured to determine which route of the new plurality of potential routes is a new optimal route based on new ratings calculated for each of the new potential routes based on the aggregated route information and the preselected criterion; and
   the network interface module further configured to transmit direction information to the client device where the direction information includes directions from the present location to the destination location along the new optimal route.

6. The system of claim 5 where the route monitoring module is further executable to add the progression information received from the client device to the aggregated route information associated with the particular route segment of the optimal route in response to the client device being in transit along the optimal route.

7. The system of claim 1 where:
   the processor of the navigation server is configured to transmit a request for traffic information to a traffic server;
   the network interface module of the navigation server is further executable to receive the traffic information from the traffic server; and
   the optimal route determination module is further configured to determine the optimal route based on the route information, the aggregated route information, the preselected criterion, and the traffic information.

8. The system of claim 1 where the preselected criterion is at least one of a user rating provided by the client device, a user rating provided by the first mobile device and a user rating provided by the second mobile device, or an estimation of travel time from the starting location to the destination location.

9. A method of providing navigation information comprising:
   receiving, at a navigation server, from a plurality of mobile devices, a plurality of progression information along a route segment defined by the navigation server to be only part of a route, where a progression information of the plurality of progression information, comprises a timestamp and a location, on the route segment, of a transmitting mobile device;
   storing, by the navigation server, the plurality of progression information as aggregated user data associated with the route segment;
   determining, by the navigation server, in response to receipt of a request from a client device for direction information from a starting location to a destination location, a first potential route and a second potential route, where the first potential route comprises a first plurality of route segments and the second potential route comprises a second plurality of route segments;
   calculating, by the navigation server, a first rating of the first potential route based on a preselected criterion and the aggregated user data associated with each respective route segment of the first plurality of route segments;

calculating, by the navigation server, a second rating of the second potential route based on the preselected criterion and the aggregated user data associated with each respective route segment of the second plurality of route segments;

determining, at the navigation server, an optimal route from the first potential route and the second potential route based on the first rating and the second rating; and transmitting, by the navigation server, to the client device, the direction information from the starting location to the destination location along the optimal route.

10. The method of claim 9, further comprising:

receiving, at the navigation server, from the plurality of mobile devices, a plurality of user ratings associated with the route segment; and storing, at the navigation server, the user ratings associated with the route segment as part of the aggregated user data associated with the route segment.

11. The method of claim 10, where at least some of the plurality of user ratings are received from the plurality of mobile devices via a web-browser based interface.

12. The method of claim 9, where the plurality of progression information associated with the route segment is a first plurality of progression information associated with the route segment, the method further comprising:

monitoring, by the navigation server, a second plurality of progression information associated with the route segment, where the route segment is part of the optimal route and the second plurality of progression information is received from the client device in transit along the optimal route;

updating, by the navigation server, the aggregated user data associated with the route segment while the client device is in transit along the route segment by adding the second plurality of progression information to the aggregated user data;

calculating, by the navigation server, an updated rating of the optimal route based on the preselected criterion and the updated aggregated user data;

determining, by the navigation server, that the optimal route does not meet the preselected criterion based on the updated rating;

determining, by the navigation server, a third potential route from a current location of the client device to the destination location, the third potential route comprising a third series of route segments;

calculating, by the navigation server, a third rating of the third potential route based on the preselected criterion and the aggregated user data associated with each respective route segment of the third plurality of route segments;

determining, at the navigation server, an updated optimal route from the optimal route and the third potential route based on the updated rating and the third rating; and transmitting, by the navigation server, to the client device, the direction information from the current location of the client device to the destination location using the updated optimal route.

13. The method of claim 9 further comprising:

transmitting, by the navigation server to a traffic server, a request for a first traffic information along the first potential route and in response, receiving the first traffic information from the traffic server;

transmitting, by the navigation server to the traffic server, a request for a second traffic information along the second potential route and in response, receiving the second traffic information from the traffic server;

calculating the first rating based on the first traffic information, the preselected criterion and the aggregated user data associated with each respective route segment of the first plurality of route segments;

calculating the second rating based on the second traffic information, the preselected criterion and the aggregated user data associated with each respective route segment of the second plurality of route segments.

14. The method of claim 9 where the preselected criterion is at least one of a user rating provided by the plurality of mobile devices, a user rating provided by the client device, or an estimation of travel time from the starting location to the destination location.

* * * * *